(12) United States Patent
Sawada

(10) Patent No.: US 7,570,403 B2
(45) Date of Patent: Aug. 4, 2009

(54) COLOR IMAGE PROCESSING APPARATUS

(75) Inventor: Takayuki Sawada, Numaza (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 477 days.

(21) Appl. No.: 11/080,845

(22) Filed: Mar. 16, 2005

(65) Prior Publication Data

US 2006/0209125 A1    Sep. 21, 2006

(51) Int. Cl.
G03F 3/08 (2006.01)
H04N 1/40 (2006.01)
H04N 1/387 (2006.01)
H04N 1/46 (2006.01)
G06K 9/00 (2006.01)
G06K 9/34 (2006.01)

(52) U.S. Cl. ........................ 358/522; 358/523; 358/538; 358/448; 358/453; 382/162; 382/168; 382/173

(58) Field of Classification Search ................ 358/518, 358/515, 519, 500, 453, 521, 443, 286, 1.9, 358/452, 534, 2.1, 530, 1.16, 3.24, 520, 1.13, 358/1.15, 3.23, 1.6, 3.01, 3.1, 448, 522, 523, 358/538; 347/43, 172, 183, 184, 24, 232, 347/40, 15; 382/162, 209, 286, 164, 232, 382/264, 100, 248, 243, 168, 173; 345/591; 101/484; 399/81; 715/517

See application file for complete search history.

(56) References Cited

U.S. PATENT DOCUMENTS

| | | | | |
|---|---|---|---|---|
| 4,873,570 A * | 10/1989 | Suzuki et al. | ................ | 358/518 |
| 4,980,758 A * | 12/1990 | Matsunawa et al. | ......... | 358/515 |
| 4,996,591 A * | 2/1991 | Kadowaki et al. | ........... | 358/519 |
| 5,119,185 A * | 6/1992 | Ikeda et al. | ................. | 358/500 |
| 5,138,443 A * | 8/1992 | Ikeda et al. | ................. | 358/518 |
| 5,204,665 A * | 4/1993 | Bollman et al. | ............. | 358/515 |
| 5,241,609 A * | 8/1993 | Hasebe et al. | ............... | 358/453 |
| 5,311,212 A * | 5/1994 | Beretta | ....................... | 345/591 |
| 5,329,385 A * | 7/1994 | Washio | ....................... | 358/515 |
| 5,461,490 A * | 10/1995 | Yonezawa | .................... | 358/445 |
| 5,489,989 A * | 2/1996 | Shimizu et al. | ............. | 358/443 |
| 5,495,350 A * | 2/1996 | Shimizu et al. | ............. | 358/521 |
| 5,596,655 A * | 1/1997 | Lopez | ......................... | 382/286 |
| 5,621,546 A * | 4/1997 | Klassen et al. | .............. | 358/518 |
| 5,719,689 A * | 2/1998 | Terada | ......................... | 358/515 |
| 5,724,440 A * | 3/1998 | Funada et al. | ............... | 358/518 |
| 5,740,334 A * | 4/1998 | Lin et al. | ...................... | 358/1.9 |

(Continued)

FOREIGN PATENT DOCUMENTS

JP    03-177853 A    8/1991

*Primary Examiner*—Twyler L Haskins
*Assistant Examiner*—Jonathan R Beckley
(74) *Attorney, Agent, or Firm*—Foley & Lardner LLP

(57) ABSTRACT

A color conversion section in an image processing apparatus converts input colors at positions of interest in input color document data to a limited number of colors, on the basis of page layout information that is updated on a page-by-page basis and delivered from a page layout analysis section, a color-assignment table that is updated on a page-by-page basis and delivered from a color-assignment table generating section, and color category attribute information relating to the positions of interest in the input color document data, which is delivered from a color categorizing section.

11 Claims, 7 Drawing Sheets

U.S. PATENT DOCUMENTS

| | | | |
|---|---|---|---|
| 5,748,345 A * | 5/1998 | Ozaki et al. | 358/452 |
| 5,748,785 A * | 5/1998 | Mantell et al. | 358/534 |
| 5,768,403 A * | 6/1998 | Suzuki et al. | 358/2.1 |
| 5,786,906 A * | 7/1998 | Shishizuka | 358/515 |
| 5,892,595 A * | 4/1999 | Yamakawa et al. | 358/530 |
| 5,892,891 A * | 4/1999 | Dalal et al. | 358/1.9 |
| 6,035,059 A * | 3/2000 | Kurosawa et al. | 382/164 |
| 6,157,734 A | 12/2000 | Iida | 358/518 |
| 6,213,584 B1 * | 4/2001 | Noyes et al. | 347/40 |
| 6,219,454 B1 * | 4/2001 | Kawano et al. | 382/232 |
| 6,226,397 B1 * | 5/2001 | Yamagata et al. | 382/162 |
| 6,302,522 B1 * | 10/2001 | Rumph et al. | 347/43 |
| 6,462,834 B1 * | 10/2002 | Yamamoto et al. | 358/1.9 |
| 6,463,172 B1 * | 10/2002 | Yoshimura | 382/162 |
| 6,480,624 B1 * | 11/2002 | Horie et al. | 358/1.9 |
| 6,486,981 B1 * | 11/2002 | Shimura et al. | 358/500 |
| 6,519,360 B1 * | 2/2003 | Tanaka | 382/164 |
| 6,546,132 B1 * | 4/2003 | Bhattacharjya et al. | 382/167 |
| 6,554,385 B2 * | 4/2003 | Kikuchi et al. | 347/15 |
| 6,788,441 B1 * | 9/2004 | Ohkawa | 382/162 |
| 6,847,377 B2 * | 1/2005 | Kitahara et al. | 358/520 |
| 6,860,202 B2 * | 3/2005 | Okuda | 101/484 |
| 6,870,962 B2 * | 3/2005 | Lee et al. | 382/248 |
| 6,911,993 B2 * | 6/2005 | Nishikawa et al. | 347/116 |
| 6,973,210 B1 * | 12/2005 | Platt et al. | 382/162 |
| 7,072,084 B2 * | 7/2006 | Shirasawa | 358/1.9 |
| 7,099,506 B2 * | 8/2006 | Mishima | 358/1.9 |
| 7,142,711 B2 * | 11/2006 | Goto et al. | 382/167 |
| 7,170,647 B2 * | 1/2007 | Kanatsu | 358/453 |
| 7,190,487 B2 * | 3/2007 | Dalrymple et al. | 358/1.9 |
| 7,324,244 B2 * | 1/2008 | Yamamoto et al. | 358/462 |
| 2002/0097412 A1 * | 7/2002 | Shibata et al. | 358/1.9 |
| 2002/0136454 A1 * | 9/2002 | Park et al. | 382/168 |
| 2003/0081831 A1 * | 5/2003 | Fukao et al. | 382/264 |
| 2004/0091147 A1 * | 5/2004 | Matsushiro et al. | 382/162 |
| 2004/0114815 A1 * | 6/2004 | Shibaki et al. | 358/1.16 |
| 2004/0125411 A1 * | 7/2004 | Tonami et al. | 358/3.24 |
| 2004/0179713 A1 * | 9/2004 | Tani et al. | 382/100 |
| 2004/0212838 A1 * | 10/2004 | Yamamoto et al. | 358/3.24 |
| 2005/0036173 A1 * | 2/2005 | Hayashi et al. | 358/1.13 |
| 2005/0094871 A1 * | 5/2005 | Berns et al. | 358/1.9 |
| 2005/0100211 A1 * | 5/2005 | Gibson et al. | 358/3.24 |
| 2005/0180645 A1 * | 8/2005 | Hasegawa et al. | 382/243 |
| 2005/0264849 A1 * | 12/2005 | Hagiwara | 358/3.24 |
| 2005/0281577 A1 * | 12/2005 | Tamura et al. | 399/81 |
| 2006/0056711 A1 * | 3/2006 | Lee et al. | 382/232 |
| 2006/0179405 A1 * | 8/2006 | Chao et al. | 715/517 |
| 2006/0209125 A1 * | 9/2006 | Sawada | 347/43 |
| 2006/0209332 A1 * | 9/2006 | Izumikawa | 358/1.15 |

* cited by examiner

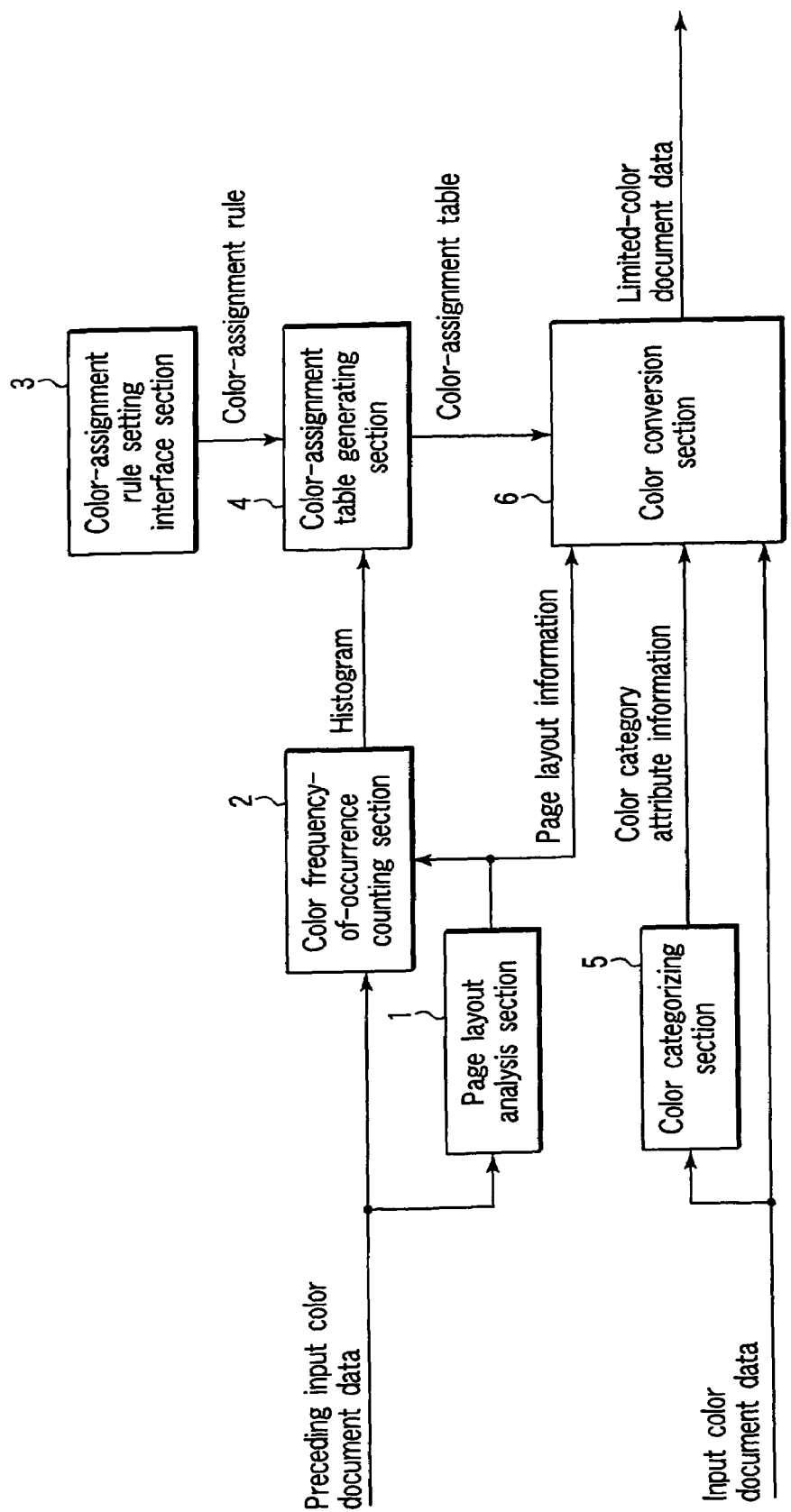
F I G. 1

| Input | | Output (selected color conversion section) |
|---|---|---|
| Layout attribute | Histogram information | |
| Character region | Achromatic category | Achromatic color |
| Character region | Chromatic category with first-rank frequency | Achromatic color |
| Character region | Chromatic category with second-rank frequency | Same hue as chromatic category with second-rank frequency |
| Character region | Chromatic category with third-rank frequency | Same hue as chromatic category with second-rank frequency |
| Character region | Chromatic category with fourth-rank frequency | Same hue as chromatic category with second-rank frequency |
| Character region | Chromatic category with fifth-rank frequency | Same hue as chromatic category with second-rank frequency |
| Character region | Chromatic category with sixth-rank frequency | Same hue as chromatic category with second-rank frequency |
| Photo region | (Don't care) | Achromatic color |
| Other region | Achromatic category | Achromatic color |
| Other region | Chromatic category with first-rank frequency | Achromatic color |
| Other region | Chromatic category with second-rank frequency | Same hue as chromatic category with second-rank frequency |
| Other region | Chromatic category with third-rank frequency | Same hue as chromatic category with second-rank frequency |
| Other region | Chromatic category with fourth-rank frequency | Same hue as chromatic category with second-rank frequency |
| Other region | Chromatic category with fifth-rank frequency | Same hue as chromatic category with second-rank frequency |
| Other region | Chromatic category with sixth-rank frequency | Same hue as chromatic category with second-rank frequency |

F I G. 4

| Input | | Output (selected color conversion section) |
|---|---|---|
| Layout attribute | Histogram information | |
| Character region | Achromatic category | Achromatic color |
| Character region | Chromatic category with first-rank frequency | Same hue as chromatic category with first-rank frequency |
| Character region | Chromatic category with second-rank frequency | Same hue as chromatic category with first-rank frequency |
| Character region | Chromatic category with third-rank frequency | Same hue as chromatic category with first-rank frequency |
| Character region | Chromatic category with fourth-rank frequency | Same hue as chromatic category with first-rank frequency |
| Character region | Chromatic category with fifth-rank frequency | Same hue as chromatic category with first-rank frequency |
| Character region | Chromatic category with sixth-rank frequency | Same hue as chromatic category with first-rank frequency |
| Photo region | (Don't care) | Achromatic color |
| Other region | Achromatic category | Achromatic color |
| Other region | Chromatic category with first-rank frequency | Same hue as chromatic category with first-rank frequency |
| Other region | Chromatic category with second-rank frequency | Same hue as chromatic category with first-rank frequency |
| Other region | Chromatic category with third-rank frequency | Same hue as chromatic category with first-rank frequency |
| Other region | Chromatic category with fourth-rank frequency | Same hue as chromatic category with first-rank frequency |
| Other region | Chromatic category with fifth-rank frequency | Same hue as chromatic category with first-rank frequency |
| Other region | Chromatic category with sixth-rank frequency | Same hue as chromatic category with first-rank frequency |

F I G. 5

| Input | | Output (selected color conversion section) |
|---|---|---|
| Layout attribute | Histogram information | |
| Character region | Achromatic category | Achromatic color |
| Character region | Chromatic category with first-rank frequency | Same hue as chromatic category with second-rank frequency |
| Character region | Chromatic category with second-rank frequency | Same hue as chromatic category with second-rank frequency |
| Character region | Chromatic category with third-rank frequency | Same hue as chromatic category with second-rank frequency |
| Character region | Chromatic category with fourth-rank frequency | Same hue as chromatic category with second-rank frequency |
| Character region | Chromatic category with fifth-rank frequency | Same hue as chromatic category with second-rank frequency |
| Character region | Chromatic category with sixth-rank frequency | Same hue as chromatic category with second-rank frequency |
| Photo region | (Don't care) | Same hue as chromatic category with second-rank frequency |
| Other region | Achromatic category | Achromatic color |
| Other region | Chromatic category with first-rank frequency | Same hue as chromatic category with second-rank frequency |
| Other region | Chromatic category with second-rank frequency | Same hue as chromatic category with second-rank frequency |
| Other region | Chromatic category with third-rank frequency | Same hue as chromatic category with second-rank frequency |
| Other region | Chromatic category with fourth-rank frequency | Same hue as chromatic category with second-rank frequency |
| Other region | Chromatic category with fifth-rank frequency | Same hue as chromatic category with second-rank frequency |
| Other region | Chromatic category with sixth-rank frequency | Same hue as chromatic category with second-rank frequency |

FIG. 6

| Input | | Output (selected color conversion section) |
|---|---|---|
| Layout attribute | Histogram information | |
| Character region | Achromatic category | Achromatic color |
| Character region | Chromatic category with first-rank frequency | Achromatic color |
| Character region | Chromatic category with second-rank frequency | Manually designated hue |
| Character region | Chromatic category with third-rank frequency | Manually designated hue |
| Character region | Chromatic category with fourth-rank frequency | Manually designated hue |
| Character region | Chromatic category with fifth-rank frequency | Manually designated hue |
| Character region | Chromatic category with sixth-rank frequency | Manually designated hue |
| Photo region | (Don't care) | Achromatic color |
| Other region | Achromatic category | Achromatic color |
| Other region | Chromatic category with first-rank frequency | Achromatic color |
| Other region | Chromatic category with second-rank frequency | Manually designated hue |
| Other region | Chromatic category with third-rank frequency | Manually designated hue |
| Other region | Chromatic category with fourth-rank frequency | Manually designated hue |
| Other region | Chromatic category with fifth-rank frequency | Manually designated hue |
| Other region | Chromatic category with sixth-rank frequency | Manually designated hue |

FIG. 7

| Input | | Output (selected color conversion section) |
|---|---|---|
| Layout attribute | Histogram information | |
| Character region | Achromatic category | Achromatic color |
| Character region | Chromatic category with first-rank frequency | Manually designated hue |
| Character region | Chromatic category with second-rank frequency | Manually designated hue |
| Character region | Chromatic category with third-rank frequency | Manually designated hue |
| Character region | Chromatic category with fourth-rank frequency | Manually designated hue |
| Character region | Chromatic category with fifth-rank frequency | Manually designated hue |
| Character region | Chromatic category with sixth-rank frequency | Manually designated hue |
| Photo region | (Don't care) | Achromatic color |
| Other region | Achromatic category | Achromatic color |
| Other region | Chromatic category with first-rank frequency | Manually designated hue |
| Other region | Chromatic category with second-rank frequency | Manually designated hue |
| Other region | Chromatic category with third-rank frequency | Manually designated hue |
| Other region | Chromatic category with fourth-rank frequency | Manually designated hue |
| Other region | Chromatic category with fifth-rank frequency | Manually designated hue |
| Other region | Chromatic category with sixth-rank frequency | Manually designated hue |

FIG. 8

| Input | | Output (selected color conversion section) |
|---|---|---|
| Layout attribute | Color category attribute | |
| Character region | Achromatic color | Achromatic color |
| Character region | Blue | Achromatic color |
| Character region | Red | Red |
| Character region | Yellow | Red |
| Character region | Cyan | Red |
| Character region | Magenta | Red |
| Character region | Green | Red |
| Photo region | (Don't care) | Achromatic color |
| Other region | Achromatic color | Achromatic color |
| Other region | Blue | Achromatic color |
| Other region | Red | Red |
| Other region | Yellow | Red |
| Other region | Cyan | Red |
| Other region | Magenta | Red |
| Other region | Green | Red |

FIG. 9

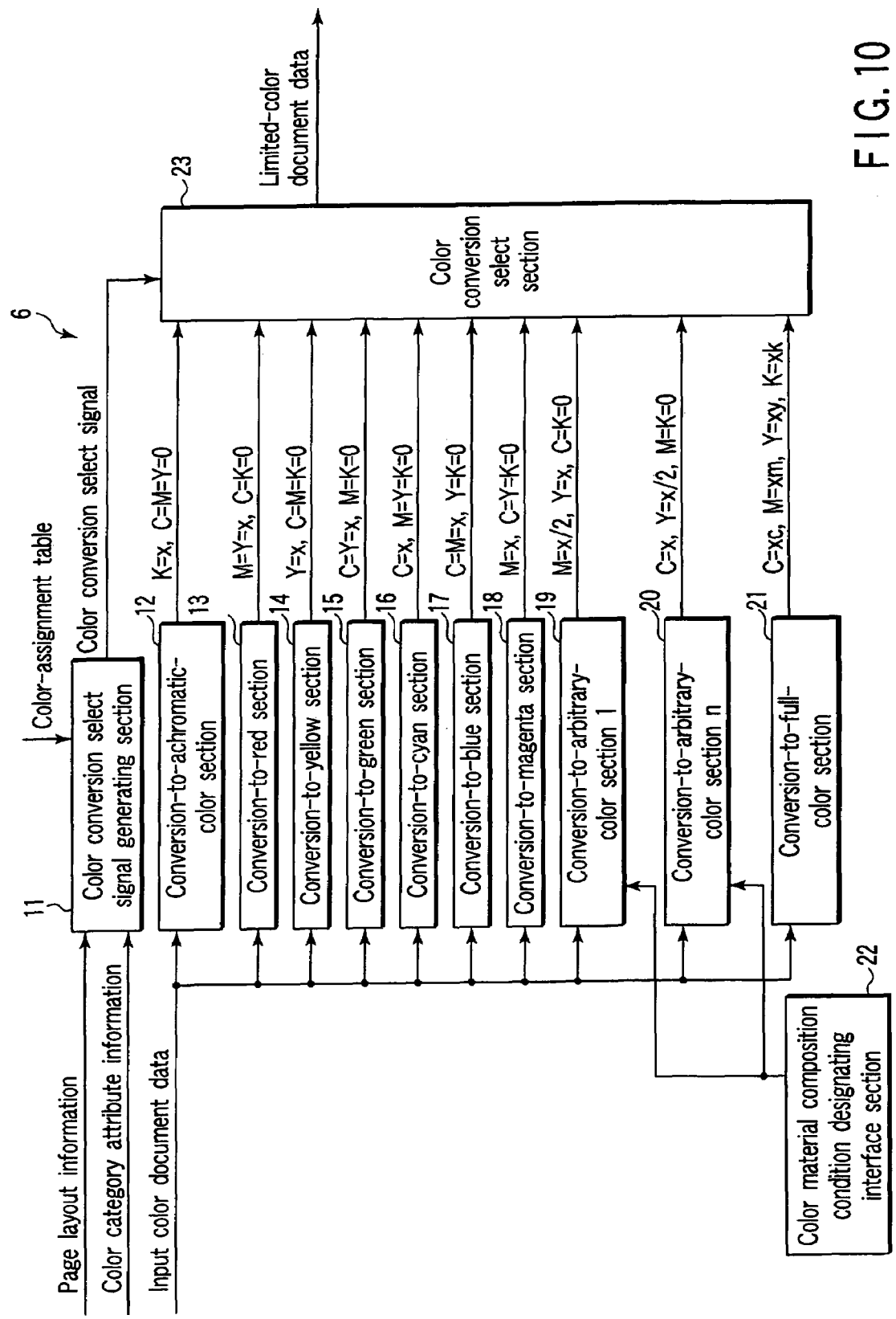
F I G. 10

COLOR IMAGE PROCESSING APPARATUS

BACKGROUND OF THE INVENTION

1. Field of the Invention

The present invention relates to a color image processing apparatus that executes an image process for limited-color print in color document printing.

2. Description of the Related Art

In the prior art, in color document printing, there are full-color printing in which original colors are output with fidelity and limited-color printing in which the number of colors is reduced and printing is effected. The limited-color printing is effective means capable of saving color materials and reducing a printing cost.

A commonly used method is red/black 2-color printing. In the red/black 2-color printing, the colors to be used are limited to red and black, as the term of this method indicates. In another color-reducing method, limited colors to be used are selected oh the basis of the color state of an original color document (the kinds of colors appearing on the document).

There has also been proposed a method in which the color state of each page of an original color document is detected in association with multi-page continuous printing, and the selection of limited colors is changed.

It is important to reduce a printing cost and to enhance the ease in reading/understanding, in particular, in limited-color print for business documents.

For example, in the case of a color document including both a photo region and a character region, proper color assignment has to be done to the respective regions. If uniform color assignment is done, it would be likely that the photo region becomes difficult to view, or color characters that to be emphasized in the character region may be assigned a color that differs from the intended color at the time when the original document is created. On the other hand, there may be a case in which it is effective, in terms of ease in understanding, to intentionally use a color that differs from the color on the original color document.

In the conventional limited-color printing technique, in particular, in connection with the above-described case, it is difficult to assign different colors to a photo region and a character region, or to flexibly assign colors in accordance with the color state.

BRIEF SUMMARY OF THE INVENTION

The object of an aspect of the present invention is to provide a color image processing apparatus having a color assignment function for limited-color print that is easy to read/understand.

According to an aspect of the present invention, there is provided a color image processing apparatus comprising: color frequency-of-occurrence counting means for counting frequencies of occurrence of colors in input color document data on a page-by-page basis; page layout generating means for discriminating a photo region and a non-photo region and generating page layout attribute information at a given position in the color document data; color-assignment table generating means for generating a color-assignment table corresponding to a combination of an arbitrary input color category and an arbitrary page layout attribute, on the basis of color frequency-of-occurrence information that is delivered from the color frequency-of-occurrence counting means; color categorizing means for classifying input colors at positions of interest in the input color document data into predetermined color categories, and generating color category attribute information that is representative of a classification result; and color conversion means for converting the input colors at positions of interest in the input color document data to colors that are designated by the color-assignment table that is generated by the color-assignment table generating means, on the basis of the color category attribute information that is generated by the color categorizing means and the page layout attribute information that is generated by the page layout generating means.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the embodiments given below, serve to explain the principles of an aspect of the invention.

FIG. 1 is a block diagram that schematically shows the structure of a color image processing apparatus according to the present invention;

FIG. 4 shows an example of setting of a color assignment rule;

FIG. 5 shows an example of setting of the color assignment rule;

FIG. 6 shows an example of setting of the color assignment rule;

FIG. 7 shows an example of setting of the color assignment rule;

FIG. 8 shows an example of setting of the color assignment rule;

FIG. 9 is a view for explaining the content of a color assignment table;

FIG. 10 shows an example of the internal structure of a color conversion section.

DETAILED DESCRIPTION OF THE INVENTION

Figure 2:
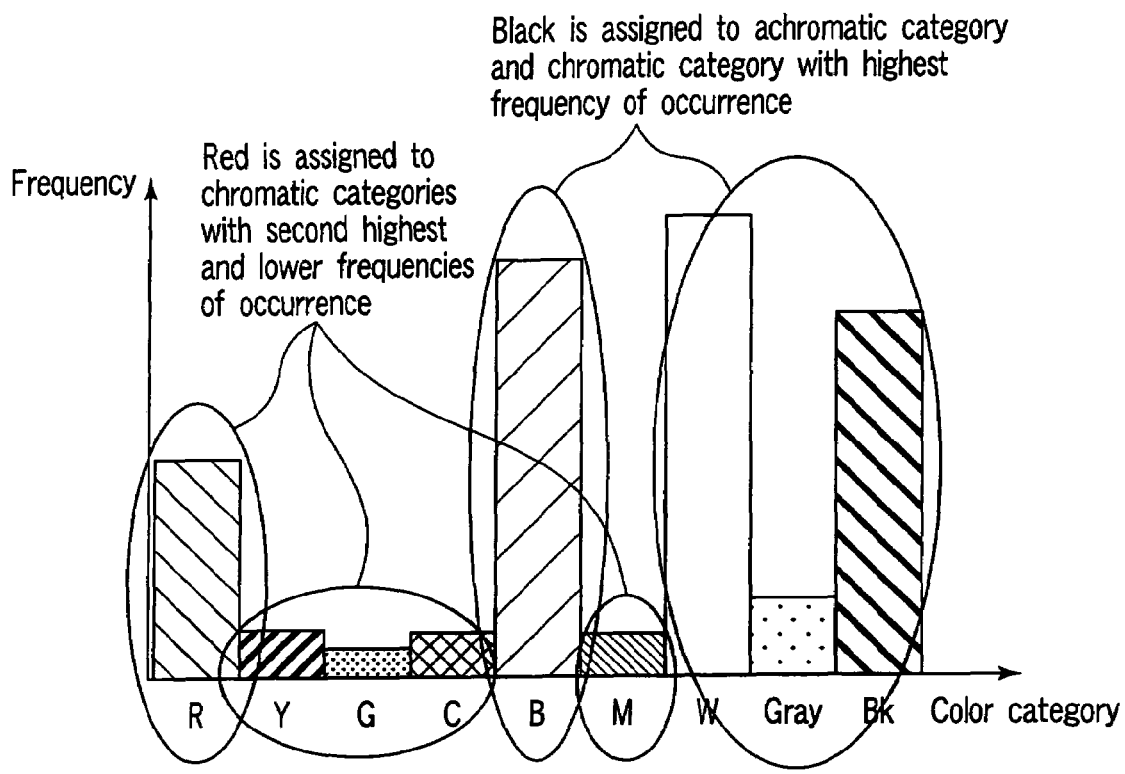
FIG. 2 shows an example of a histogram that is output from a color frequency-of-occurrence counting section.

An embodiment of the present invention will now be described with reference to the accompanying drawings.

FIG. 1 schematically shows the structure of a color image processing apparatus according to the present invention. The color image processing apparatus of this invention comprises a page layout analysis section 1, color frequency-of-occurrence counting section 2, a color-assignment rule setting interface section 3, a color-assignment table generating section 4, a color categorizing section 5, and a color conversion section 6.

The page layout analysis section 1 divides a page of interest of color document data, which is input in precedence, into a photo region, a character region, and some other region.

The color frequency-of-occurrence counting section 2 counts the frequencies of occurrence of colors, which appear on a page of interest in preceding input color document data, in accordance with color categories.

The color-assignment rule setting interface section 3 is an interface for manually setting, from outside, a rule for color assignment in association with a combination of an arbitrary layout attribute and a color frequency-of-occurrence count result (histogram). For example, in the case of a personal computer or an MFP, a control panel or the like is connected.

The color-assignment table generating section 4 generates a color-assignment table on the basis of the delivered color-assignment rule and the histogram that is delivered from the color frequency-of-occurrence counting section 2.

The color categorizing section 5 classifies input colors at positions of interest in the input color document data into predetermined color categories, and generates color category attribute information that is representative of a classification result.

The color conversion section 6 converts the input colors at positions of interest in the input color document data to a limited number of colors, on the basis of page layout information that is updated on a page-by-page basis and delivered from the page layout analysis section 1, the color-assignment table that is updated on a page-by-page basis and delivered from the color-assignment table generating section 4, and the color category attribute information relating to the position of interest in the input color document data, which is delivered from the color categorizing section 5.

Next, a description is given of the operation of the apparatus of the present invention with the above-described structure, which reduces the number of colors in color document data comprising a plurality of pages and outputs a color document with a limited number of colors.

Prior to color conversion, input color document data is input in precedence, on a page-by-page basis, to the page layout analysis section 1 and color frequency-of-occurrence counting section 2.

The page layout analysis section 1 divides a page of interest of color document data, which is input in precedence, into a photo region, a character region, and an other region, and delivers page layout information, which is representative of a region division result, to the color frequency-of-occurrence counting section 2 and color conversion section 6.

The color frequency-of-occurrence counting section 2 counts the frequency of occurrence of colors, which appear on a page of interest in preceding input color document data, with respect to each color category. Typical examples of the color categories are seven colors, namely, red, yellow, green, cyan, blue, magenta, and an achromatic color. Of these colors, the achromatic color may further be classified into white (highlight gray), intermediate gray and black (dark gray). The color categories in the present invention are not limited to these examples.

FIG. 2 shows an example of the histogram that is output from the color frequency-of-occurrence counting section 2. The histogram that is output from the color frequency-of-occurrence counting section 2 is delivered to the color-assignment table generating section 4.

In the case where preceding input color document data is a bitmap image, when the color frequency-of-occurrence counting section 2 counts the frequency of occurrence of colors, it samples pixels at predetermined intervals and determines the category of each color. In general, in the case of a photo or a figure, sampling at large intervals causes no problem in understanding the general tendency of the frequency of occurrence of colors. However, since a character is thin, sampling at large intervals may fail to sample, for instance, a color character. Thus, with reference to page layout information that is supplied from the page layout analysis section 1, a character is sampled at a smaller interval than a non-character region.

Figure 3:
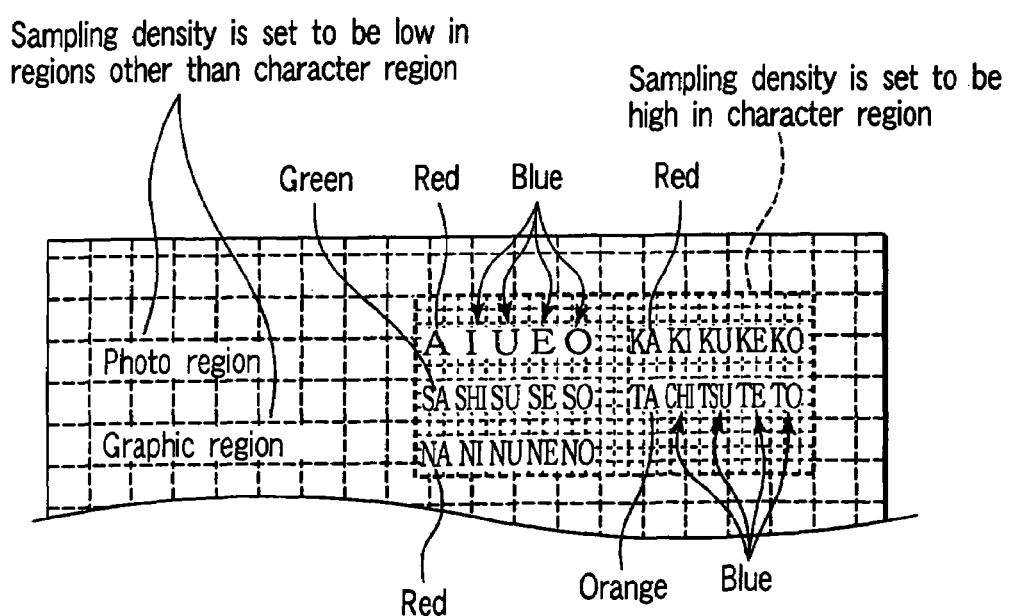
FIG. 3 illustrates low/high density discrimination of sampling points by the color frequency-of-occurrence counting section.

FIG. 3 shows an example of sampling. In a non-character region, the sampling density is set to be low. In a character region, the sampling density is set to be high. In FIG. 3, characters include red, green, blue and orange ones.

On the other hand, in the case where the preceding input color document data is composed of character codes, in order to properly evaluate the frequency of occurrence of each color, the color frequency-of-occurrence counting section 2 calculates the frequency of occurrence of a character color, which belongs to a certain color category, as a value that is proportional to [character size×number of characters].

The color-assignment rule setting interface section 3 is an interface for manually setting, from outside, a rule for color assignment in association with a combination of an arbitrary layout attribute and a color frequency-of-occurrence count result (histogram).

FIG. 4 shows an example of setting of the color assignment rule.

In the color-assignment rule exemplified in FIG. 4, in the case where the layout attribute is a character region, an achromatic color is assigned as an output color to an input color that is categorized in an achromatic category. The achromatic color is also assigned as an output color to an input color that is categorized in a chromatic category with a first-rank frequency of occurrence. A color with the same hue as the color of the chromatic category of a second-rank frequency of occurrence is assigned as an output color to each of input colors that are categorized in chromatic categories of second-rank to sixth-rank (lowest rank) frequencies of occurrence. In the case where the layout attribute is a photo region, an achromatic color is assigned as an output color to all input colors, regardless of the content of the histogram. In the case whether the layout attribute is another region (neither a character region nor a photo region), the same color assignment as in the case of the character region is executed. The color-assignment rule information, which is set through the color-assignment rule setting interface section 3, is delivered to the color-assignment table generating section 4.

In addition to the example shown in FIG. 4, color-assignment rules as shown in FIGS. 5 to 8 can arbitrarily be set.

The color-assignment table generating section 4 generates a color-assignment table on the basis of the delivered color-assignment rule information and the histogram that is delivered from the color frequency-of-occurrence counting section 2, and supplies the color-assignment table to the color conversion section 6. Assume now that a histogram, which represents the color frequency-of-occurrence on a page of interest, is as shown in FIG. 2. According to the histogram shown in FIG. 2, the chromatic category with the first-rank frequency-of-occurrence is a blue category, and the chromatic category with the second-rank frequency-of-occurrence is red. Other chromatic categories are with third- and lower-rank frequencies-of-occurrence.

FIG. 9 shows a color-assignment table that is applied to the page of interest under the color-assignment rule shown in FIG. 4. Specifically, in the case where the layout attribute is a character region, an achromatic color is assigned as an output color to an input color that is categorized in an achromatic category. The achromatic color is also assigned as an output color to an input color that is categorized in a blue category. A color with the hue of red is assigned as an output color to each of input colors that are categorized in red and other chromatic categories (excluding the blue category). In the case where the layout attribute is a photo region, an achromatic color is assigned as an output color to all input colors, regardless of the content of the histogram. In the case whether the layout attribute is an other region (neither a character region nor a photo region), the same color assignment as in the case of the character region is executed.

The above-described process blocks preprocess input color document data on a page-by-page basis, prior to color conversion of the input color document data. A color-assignment table is determined for each page and is delivered to the color conversion section 6.

The color categorizing section 5 and color conversion section 6, which are to be described below, operate at a time of executing color conversion of input color document data.

The color categorizing section 5 classifies input colors at positions of interest in the input color document data into predetermined color categories, generates color category attribute information that is representative of a classification result, and delivers the color category attribute information to the color conversion section 6. The color categories for classification are, in principle, set to be the same as the color categories for frequency counting in the color frequency-of-occurrence counting section 2. Typically, colors are classified into seven categories, red, yellow, green, cyan, blue, magenta, and an achromatic color. Of these colors, the achromatic color may further be classified into white (highlight gray), intermediate gray and black (dark gray). The color categories in the present invention are not limited to these examples.

The color conversion section 6 converts the input colors at positions of interest in the input color document data to a limited number of colors, on the basis of page layout information that is updated on a page-by-page basis and delivered from the page layout analysis section 1, the color-assignment table that is updated on a page-by-page basis and delivered from the color-assignment table generating section 4, and the color category attribute information relating to the position of interest in the input color document data, which is delivered from the color categorizing section 5.

FIG. 10 shows an example of the internal structure of the color conversion section 6. The color conversion section 6, shown in FIG. 10, comprises a color conversion select signal generating section 11, a plurality of sub-color conversion sections 12 to 21, a color material composition condition designating interface section 22, and a color conversion selection section 23.

The sub-color conversion sections 12 to 21 comprise a conversion-to-achromatic-color section 12, a conversion-to-red section 13, a conversion-to-yellow section 14, a conversion-to-green section 15, a conversion-to-cyan section 16, a conversion-to-blue section 17, a conversion-to-magenta section 18, one or more conversion-to-arbitrary-color sections 19, . . . , 20, and a conversion-to-full-color section 21.

The conversion-to-achromatic-color section 12 outputs, with respect to an arbitrary input color, color material amount signals of C, M, Y and K, which belong to a set, $\{(C, M, Y, K)|C=M=Y=0, K=x,$ (x: an arbitrary color material amount)$\}$.

The conversion-to-red section 13 outputs, with respect to an arbitrary input color, color material amount signals of C, M, Y and K, which belong to a set, $\{(C, M, Y, K)|C=K=0, M=Y=x,$ (x: an arbitrary color material amount)$\}$.

The conversion-to-yellow section 14 outputs, with respect to an arbitrary input color, color material amount signals of C, M, Y and K, which belong to a set, $\{(C, M, Y, K)|C=M=K=0, Y=x,$ (x: an arbitrary color material amount)$\}$.

The conversion-to-green section 15 outputs, with respect to an arbitrary input color, color material amount signals of C, M, Y and K, which belong to a set, $\{(C, M, Y, K)|M=K=0, C=Y=x,$ (x: an arbitrary color material amount)$\}$.

The conversion-to-cyan section 16 outputs, with respect to an arbitrary input color, color material amount signals of C, M, Y and K, which belong to a set, $\{(C, M, Y, K)|M=Y=K=0, C=x,$ (x: an arbitrary color material amount)$\}$.

The conversion-to-blue section 17 outputs, with respect to an arbitrary input color, color material amount signals of C, M, Y and K, which belong to a set, $\{(C, M, Y, K)|Y=K=0, C=M=x,$ (x: an arbitrary color material amount)$\}$.

The conversion-to-magenta section 18 outputs, with respect to an arbitrary input color, color material amount signals of C, M, Y and K, which belong to a set, $\{(C, M, Y, K)|C=Y=K=0, M=x,$ (x: an arbitrary color material amount)$\}$.

One conversion-to-arbitrary-color section 19 outputs, with respect to an arbitrary input color, color material amount signals of C, M, Y and K, which belong to a set, $\{(C, M, Y, K)|C=K=0, M=x/2, Y=x,$ (x: an arbitrary color material amount)$\}$.

One other conversion-to-arbitrary-color section 20 outputs, with respect to an arbitrary input color, color material amount signals of C, M, Y and K, which belong to a set, $\{(C, M, Y, K)|M=K=0, C=x, Y=x/2,$ (x: an arbitrary color material amount)$\}$.

The conversion-to-full-color section 21 outputs, with respect to an arbitrary input color, color material amount signals of C, M, Y and K, which belong to a set, $\{(C, M, Y, K)|C=xc, M=xm, Y=xy, K=xk,$ (xc, xm, xy, xk: an arbitrary color material amount)$\}$.

The color material composition condition designating interface section 22 is an interface for manually setting, from outside, a composition condition for CMYK color material amounts in the conversion-to-arbitrary-color sections 19, . . . , 20.

Thereby, the output from the conversion-to-arbitrary-color section, 19, . . . , 20, can be altered to, e.g. $\{(C, M, Y, K)|M=K=0, Y=x/2, C=x,$ (x: an arbitrary color material amount)$\}$. However, such a limitation is provided that the color materials of two of CMYK are always 0.

The color conversion select signal generating section 11 generates a color conversion select signal for designating one of a plurality of color conversion outputs from the sub-color conversion sections 12 to 21, on the basis of the page layout information that is updated on a page-by-page basis and delivered from the page layout analysis section 1, the color-assignment table that is updated on a page-by-page basis and delivered from the color-assignment table generating section 4, and the color category attribute information relating to the position of interest in the input color document data, which is delivered from the color categorizing section 5. The generated color conversion select signal is delivered to the color conversion select section 23.

The color conversion select section 23 selects one of color conversion outputs from the sub-color conversion sections 12 to 21 on the basis of the color conversion select signal, and delivers the selected color conversion output as output colors for a color document with limited colors.

In the case where the color-assignment table shown in FIG. 9 is given, the output from the conversion-to-achromatic-color section 12 is selected for the achromatic color and the color of the blue category in the character region, and the output from the conversion-to-red section 13 is selected for the colors of the chromatic categories other than the blue category. On the other hand, the output from the conversion-to-achromatic-color section 12 is always selected for non-character regions.

Figure 11:
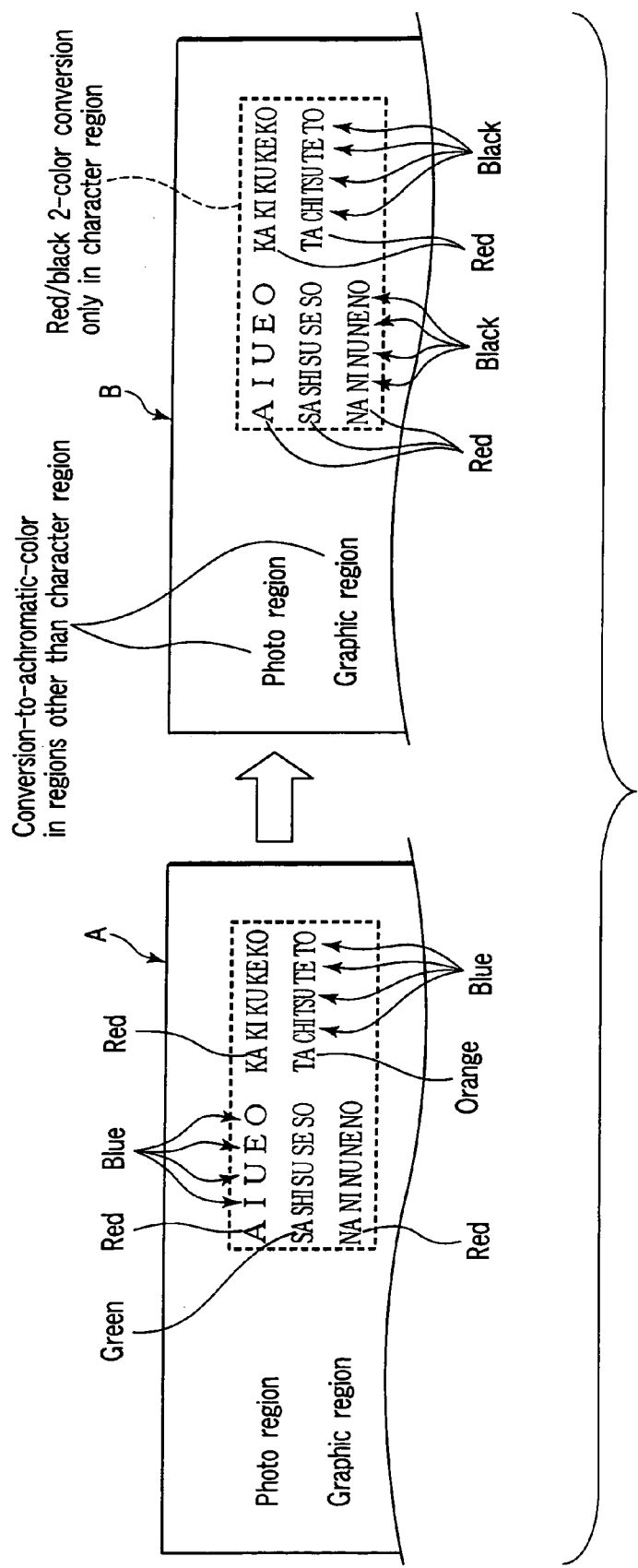
FIG. 11 is a view for explaining color conversion to limited colors.

FIG. 11 illustrates a color conversion result for limiting the number of colors, which is executed by the color conversion select section 23. Part A in FIG. 11 includes a photo region, a graphic region, and a character region including color characters of red, blue, green and orange. As is shown in part B in FIG. 11, the photo region and graphic region are expressed in achromatic color, and only the character region is expressed in two colors of red and black.

As has been described above, according to the embodiment of the present invention, in the limited-color printing that is typified by two-color printing, a color assignment process is executed on the basis of the page-by-page color frequency-of-occurrence and the page layout information. Thereby, proper color assignment can be executed for each page and for each region attribute of, e.g. a character, a photo, etc. As a result, a limited-color print result that is easy to read/understand can be obtained.

In addition, since the color-assignment rule can be set from outside, optimal color assignment can be set for various types of color documents.

In particular, only an achromatic color or only a single hue of chromatic color is assigned to a photo region. This prevents unnatural color assignment to the photo region, and realizes such a limited-color output as not to attract needless attention to a part of the photo region.

If an achromatic color is assigned to an achromatic color and a single hue of chromatic color is assigned to all chromatic colors, sharp contrast is obtained between an achromatic part and a chromatic part, and limited-color printing with an emphasis effect by coloring can be executed.

If an achromatic color is assigned to an achromatic color and a chromatic color with a first-rank frequency-of-occurrence and a single hue of chromatic color is assigned to chromatic colors with second- and lower-rank frequencies-of-occurrence, the following printing, for instance, is possible. That is, if there is a color document that is created by using a chromatic-color ink of a given color as a basic-color ink and using another color for emphasis, red/black 2-color printing can be executed by assigning red to only an emphasis part.

As regards a bitmap color document, the density for sampling pixels at the time of counting the color frequency-of-occurrence is set to be higher for a character region than for other regions. This reduces the possibility that fine color characters fail to be sampled, and proper sampling can be executed for character colors.

As regards a color document that is composed of character codes, such as a document created by a word processor, the frequency of occurrence of a character color is calculated as a value that is proportional to [character size×number of characters]. Thereby, the frequency of occurrence of a character color can properly be evaluated.

Moreover, each of the sub-color conversion sections, which constitute the color conversion section, outputs only two kinds of color material signals at maximum. Thus, even if the number of sub-color conversion sections is about eight, as in the present embodiment (i.e. limited-color printing with about eight colors), the amount of use of color material can be limited to 200% at most in all pixels.

Besides, the conversion-to-arbitrary-color section, which can set the condition for color material composition, is provided as the sub-color conversion section. Thus, the output colors can flexibly be set for input color document data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image processing apparatus comprising:
a color frequency-of-occurrence counting section which counts frequencies of occurrence of colors in input color document data on a page-by-page basis;
a page layout generating section which discriminates a photo region and a non-photo region and generates page layout attribute information at a given position in the color document data;
a color-assignment table generating section which generates a color-assignment table corresponding to a combination of an arbitrary input color category and an arbitrary page layout attribute, on the basis of color frequency-of-occurrence information that is delivered from the color frequency-of-occurrence counting section;
a color categorizing section which classifies input colors at positions of interest in the input color document data into predetermined color categories, and generates color category attribute information that is representative of a classification result; and
a color conversion section which converts the input colors at positions of interest in the input color document data to colors that are designated by the color-assignment table that is generated by the color-assignment table generating section, on the basis of the color category attribute information that is generated by the color categorizing section and the page layout attribute information that is generated by the page layout generating section;
wherein the positions of interest correspond to different regions of a document, the color-assignment table assigns one or more desired colors to each of the different regions, and the number of desired colors is variable for each of the different regions; and
wherein the color-assignment table is generated by the color-assignment table generating section based on a color-assignment rule delivered to the color image processing apparatus for an external device and a histogram that is delivered from the color frequency-of-occurrence counting section.

2. The color image processing apparatus according to claim 1, wherein the color-assignment table assigns an achromatic color to the photo region and a limited number of colors to the non-photo region.

3. The color image processing apparatus according to claim 1, wherein the color-assignment table assigns a color, which is chromatic and has a highest frequency of occurrence, to the photo region, and a limited number of colors to the non-photo region.

4. The color image processing apparatus according to claim 1, wherein the color-assignment table assigns an achromatic color to an input color that belongs to an achromatic category, and a color of a chromatic category with a highest frequency of occurrence to input colors that belong to all chromatic categories.

5. The color image processing apparatus according to claim 1, wherein the color-assignment table assigns an achromatic color to input colors that belong to an achromatic category and a chromatic category with a highest frequency of occurrence, and a color of a chromatic category with a second highest frequency of occurrence to input colors that belong to chromatic categories with the second highest and lower frequencies of occurrence.

6. The color image processing apparatus according to claim 1, wherein the color frequency-of-occurrence counting section sets a sampling density, which defines spatial intervals between pixels to be sampled, to be higher in a character region than in a non-character region at a time of counting the color frequency-of-occurrence.

7. The color image processing apparatus according to claim 1, wherein in a case where the color document data is composed of character codes, the color frequency-of-occurrence counting section calculates the color frequency-of-occurrence of a character region as a value that is proportional to [character size×number of characters].

8. A color image processing apparatus comprising:
   a color frequency-of-occurrence counting section which counts frequencies of occurrence of colors in input color document data on a page-by-page basis;
   a page layout generating section which discriminates a photo region and a non-photo region and generates page layout attribute information at a given position in the color document data;
   a color-assignment rule setting interface section which sets a color-assignment rule manually input from outside at a time of generating a color-assignment table;
   a color-assignment table generating section which generates a color-assignment table corresponding to a combination of an arbitrary input color category and an arbitrary page layout attribute, on the basis of the color-assignment rule that is input from the color-assignment rule setting interface section and color frequency-of-occurrence information that is delivered from the color frequency-of-occurrence counting section;
   a color categorizing section which classifies input colors at positions of interest in the input color document data into predetermined color categories, and generates color category attribute information that is representative of a classification result; and
   a color conversion section which converts the input colors at positions of interest in the input color document data to colors that are designated by the color-assignment table that is generated by the color-assignment table generating section, on the basis of the color category attribute information that is generated by the color categorizing section and the page layout attribute information that is generated by the page layout generating section;
   wherein the positions of interest correspond to different regions of a document, the color-assignment table assigns one or more desired colors to each of the different regions, and the number of desired colors is variable for each of the different regions; and
   wherein the color-assignment table is generated by the color-assignment table generating section based on a color-assignment rule delivered to the color image processing apparatus for an external device and a histogram that is delivered from the color frequency-of-occurrence counting section.

9. The color image processing apparatus according to claim 8, wherein the color-assignment table assigns an achromatic color to an input color that belongs to an achromatic category, and a color of a category, which is set by the color-assignment rule, to input colors that belong to all chromatic categories.

10. The color image processing apparatus according to claim 8, wherein the color-assignment table assigns an achromatic color to input colors that belong to an achromatic category and a chromatic category with a highest frequency of occurrence, and a color of a category, which is set by the color-assignment rule, to input colors that belong to chromatic categories with a second highest and lower frequencies of occurrence.

11. The color image processing apparatus according to claim 8, wherein the color frequency-of-occurrence counting section sets a sampling density, which defines spatial intervals between pixels to be sampled, to be higher in a character region than in a non-character region at a time of counting the color frequency-of-occurrence.

* * * * *